(12) United States Patent
Hatipoglu (10) Patent No.: US 7,206,455 B1
(45) Date of Patent: Apr. 17, 2007

(54) ADAPTIVE SETTING OF WAVELET SUB-BAND THRESHOLDS FOR LOW-LIGHT IMAGE DENOISING

(75) Inventor: Serkan Hatipoglu, Santa Clara, CA (US)

(73) Assignee: Eastman Kodak Company, Rochester, NY (US)

( * ) Notice: Subject to any disclaimer, the term of this patent is extended or adjusted under 35 U.S.C. 154(b) by 789 days.

(21) Appl. No.: 10/644,586

(22) Filed: Aug. 20, 2003

(51) Int. Cl.
*G06K 9/46* (2006.01)
*G06K 9/00* (2006.01)

(52) U.S. Cl. .................................. 382/240
(58) Field of Classification Search ........ 382/172–173, 382/240, 254, 260–264, 305; 375/240.16, 375/240.19; 358/505, 530
See application file for complete search history.

(56) References Cited

U.S. PATENT DOCUMENTS

| | | | |
|---|---|---|---|
| 5,619,998 A * | 4/1997 | Abdel-Malek et al. | 600/437 |
| 6,094,050 A * | 7/2000 | Zaroubi et al. | 324/309 |
| 6,700,933 B1 * | 3/2004 | Wu et al. | 375/240.16 |
| 6,879,729 B2 * | 4/2005 | Kamath et al. | 382/254 |
| 7,068,851 B1 * | 6/2006 | Berkner | 382/261 |

OTHER PUBLICATIONS

Donoho, D.L., "De-Noising By Soft-Thresholding," IEEE Trans. Info. Theory, vol. IT-41, No. 3, pp. 933-970, May 1995.

* cited by examiner

*Primary Examiner*—Amir Alavi
(74) *Attorney, Agent, or Firm*—Robert L. Walker (57) ABSTRACT

Wavelet-based denoising is provided to an image. A corrected reference image is acquired and stored. A test image is adjusted using a selected gain setting such that the mean pixel value of the adjusted test image matches the mean pixel value of the reference image. The adjusted image is decomposed into sub-bands using a wavelet transformation. Thresholding is applied to a selected sub-band with a selected threshold setting. An inverse wavelet transformation is then applied to the sub-bands to provide a denoised image. This process is repeated such that each sub-band is tested with multiple threshold settings. The denoised images are analyzed to locate a threshold setting that is approximately optimal for each sub-band. This process is repeated for multiple light settings. A gain-threshold map is constructed by mapping each selected gain setting to the approximately optimal threshold settings for each sub-band at the selected gain setting.

20 Claims, 6 Drawing Sheets

ADAPTIVE SETTING OF WAVELET SUB-BAND THRESHOLDS FOR LOW-LIGHT IMAGE DENOISING

FIELD OF THE INVENTION

The present invention relates to denoising, and, in particular, to a method and apparatus for selecting a threshold for each sub-band for wavelet-based denoising.

BACKGROUND OF THE INVENTION

A typical film-type camera includes a mechanical shutter. Light is reflected off of a scene from either artificial or natural light conditions. The camera receives the reflected light when the mechanical shutter is opened. While the shutter is opened, the reflected light is focused on a film that contains light sensitive components. The light sensitive components of the film create a chemical recording of the received light. The image, or scene, that is recorded on the film corresponds to the total amount of light that directed onto the film during exposure to the reflected light. The total amount of light directed onto the film is related to the aperture of the shutter, and the exposure time. The exposure time of the film corresponds to the length of time that the mechanical shutter is open. The exposure time is a fixed time interval that is manually adjusted by an operator.

Digital cameras are similar to film-type cameras in that light is reflected off of the scene and received by a light sensitive component when the shutter is open. The light sensitive component may be a charge coupled device (CCD), or a complementary metal oxide semiconductor (CMOS) device. The image sensors convert light into electronic signals when exposed. The signals are provided to an image processor to store the image of the recorded scene. In digital cameras, the shutter may be a mechanical shutter that is similar to that found in the film-type camera, or an electronic shutter mechanism.

A typical image sensor includes an array of image capturing points, or pixels. Each pixel is arranged to provide a signal that is responsive to light. The signal level that is provided by each pixel is related to the intensity of the light that is received, and the length of time that the pixel is exposed. A CMOS array is arranged in rows and columns that may be read individually, while a CCD array typically provides a serial read out of the electronic signals. The electronic signals are typically converted into digital signals that are stored in a memory circuit, such that the digitized image is captured. The digitized image can be digitally manipulated for color adjustment, image contrast, image scaling, and image rotation functions.

BRIEF DESCRIPTION OF THE DRAWINGS

Non-limiting and non-exhaustive embodiments of the present invention are described with reference to the following drawings.

DETAILED DESCRIPTION OF THE PREFERRED EMBODIMENT

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, the invention is related to a wavelet-based denoising system and process. A corrected reference image is acquired and stored. A test image is adjusted using a selected gain setting such that the mean pixel value of the adjusted test image matches the mean pixel value of the reference image. The adjusted image is decomposed into sub-bands using a wavelet transformation. Thresholding is applied to a selected sub-band with a selected threshold setting. An inverse wavelet transformation is then applied to the sub-bands to provide a denoised image. This process is repeated such that each sub-band is tested with multiple threshold settings. The denoised images are analyzed to locate a threshold setting that is approximately optimal for each sub-band. This process is repeated for multiple light settings. A gain-threshold map is constructed by mapping each selected gain setting to the approximately optimal threshold settings for each sub-band at the selected gain setting.

The process for constructing the gain-threshold map may be performed using an image processing system. The gain-threshold map may be used in a process for image denoising. The process for image denoising may also be performed using an image processing system.

Example System

Figure 1:
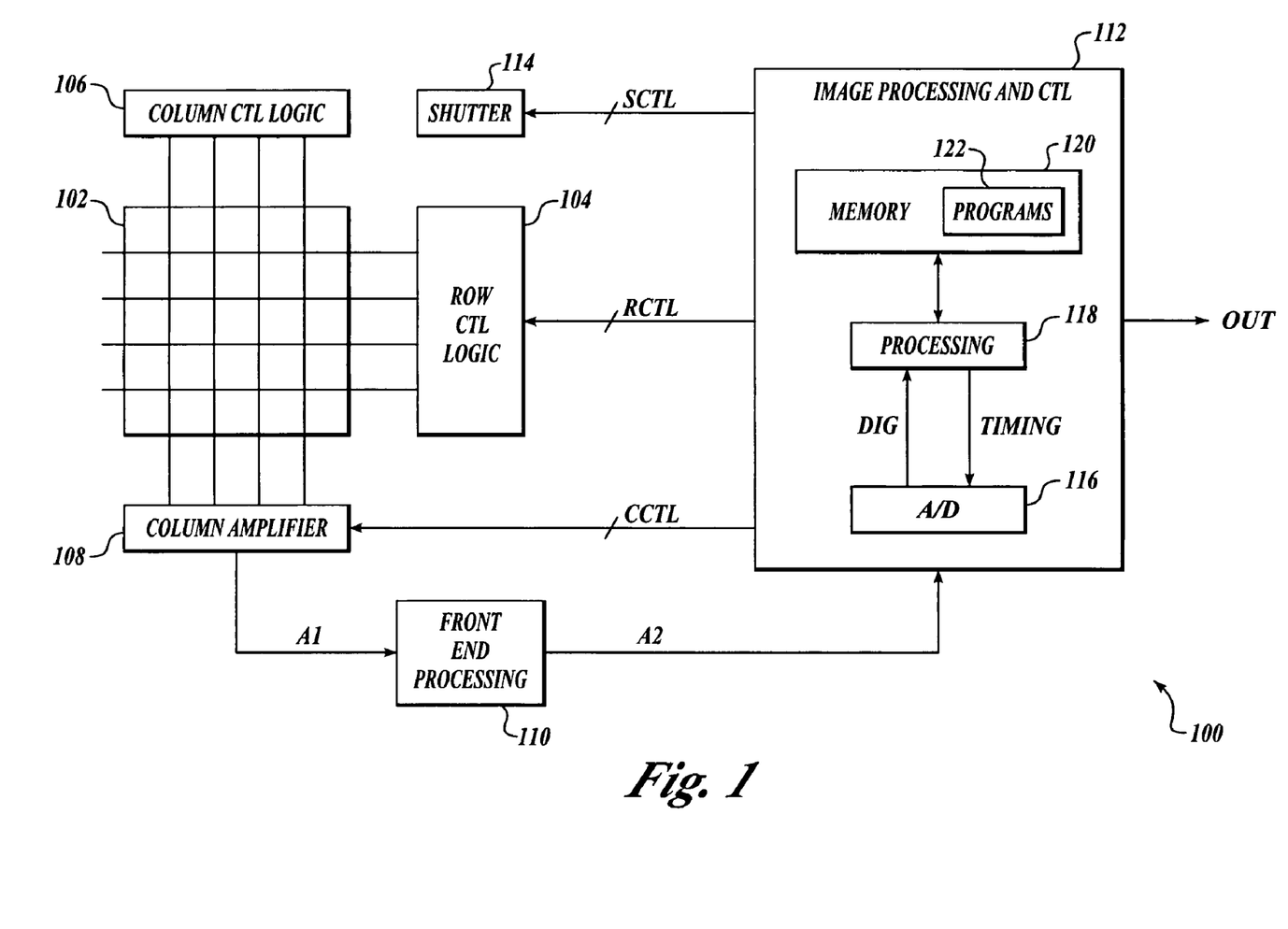
FIG. 1 illustrates an image processing system.

FIG. 1 illustrates an image processing system (100) that is arranged in accordance with aspects of the present invention. System 100 comprises an image sensor (102), a row control logic block (104), a column control logic block (106), a column amplifier block (108), a front end processing block (110), an image processing and control block (112), and a shutter (114). Image processing and control block 112 includes an analog-to-digital conversion (A/D) block (116), a processing block (118), and a memory (120). Programs (122) may be embodied in memory 120.

Image sensor 102 comprises a plurality of pixels that are organized into rows and columns. The pixels are responsive to incident light when shutter 114 is open. Shutter 114 is responsive to a shutter control signal (SCTL). Row control logic block 104 is configured to select rows in response to a row control signal (RCTL). Column control logic block 106 is configured to select columns in response to a column control signal (CCTL). Column amplifier block 108 is configured to adjust the output signals from selected pixels to provide a raw analog signal (A1). Front end processing block 110 is configured to process signal A1 to provide a processed analog signal (A2). In one example, front end processing block 110 is arranged to provide offset and gain correction for the raw analog signal (A1). In another example, front end processing block 110 is a correlated double sampling circuit (CDS) that provides offset and/or gain correction.

Image processing and control block 112 is configured to provide signals SCT, RCTL, CCTL, and a digital image signal (OUT). Image processing and control block 112 is responsive to signal A2. A/D block 116 is arranged to convert signal A2 into a digital signal (Dig) in response to signal A2. A/D block 116 is controlled by various timing signals (Timing) that may be provided by processing block 118. Processing block 118 is arranged to process the digital signal (Dig) to perform image denoising. Processing block 118 is arranged to communicate with memory 120, which receives the processed digital signal.

In one example, programs 122 are stored in memory 120, where the programs are employed by processing block 118 to perform wavelet-based image denoising in accordance with aspects of the present invention. In another example, the processing block (118) and memory block (120) are included in a single functional block such as a specially designed integrated circuit (e.g., an ASIC). In still another example, the functions provided in the processing block (118) are provided by a microprocessor, a microcontroller, or some other general purpose processing unit. In yet another example, the functions provided by the processing block (118) are provided by an electronic circuit that is specially configured such as a programmable logic device (PLD), a programmable gate array (PGA), a programmable logic array (PLA), as well as any other appropriate device or devices.

Example Process for Constructing a Gain-Threshold Map

Figure 2A:
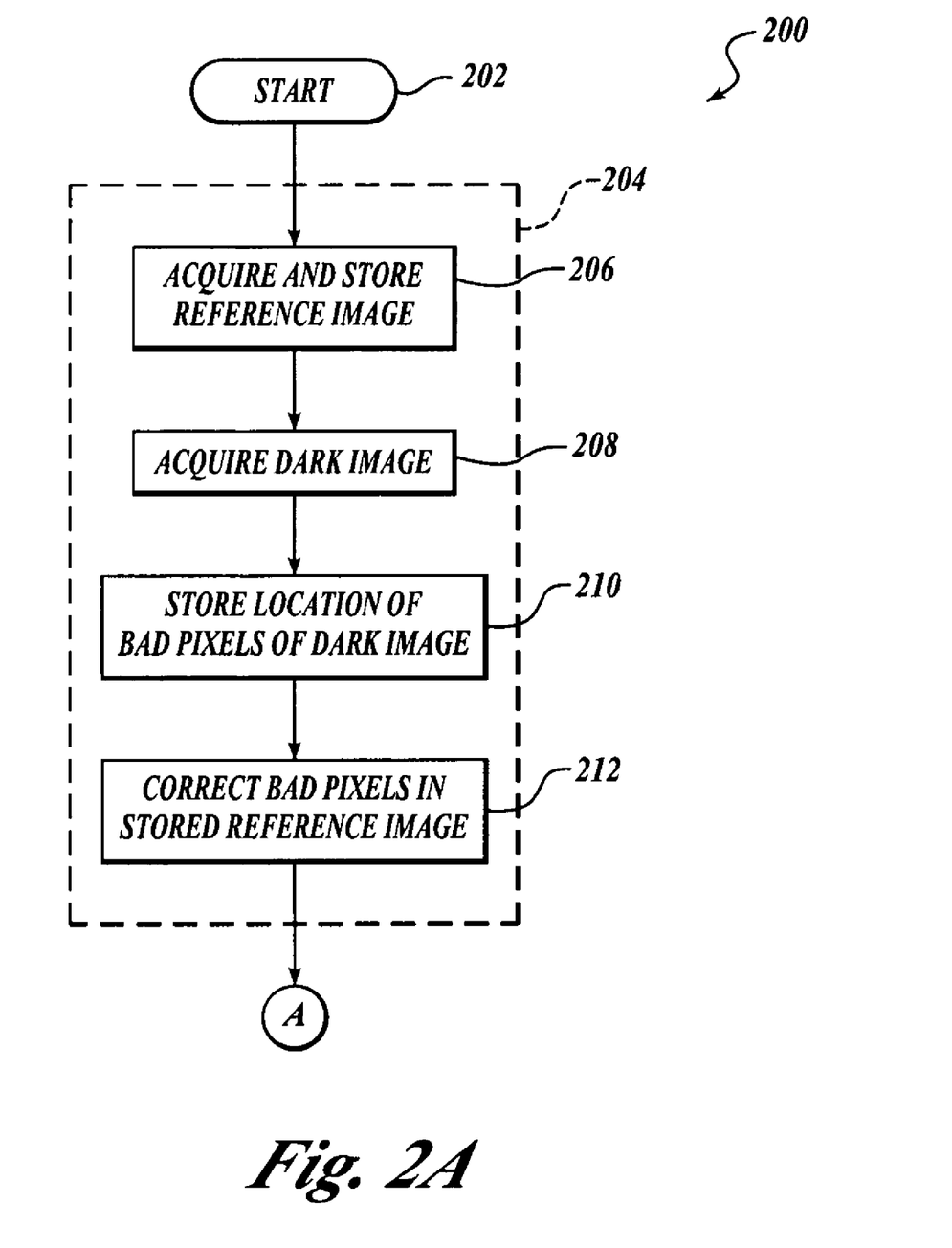
FIG. 2A through FIG. 2C illustrate a process for determining threshold settings.
Figure 2B:
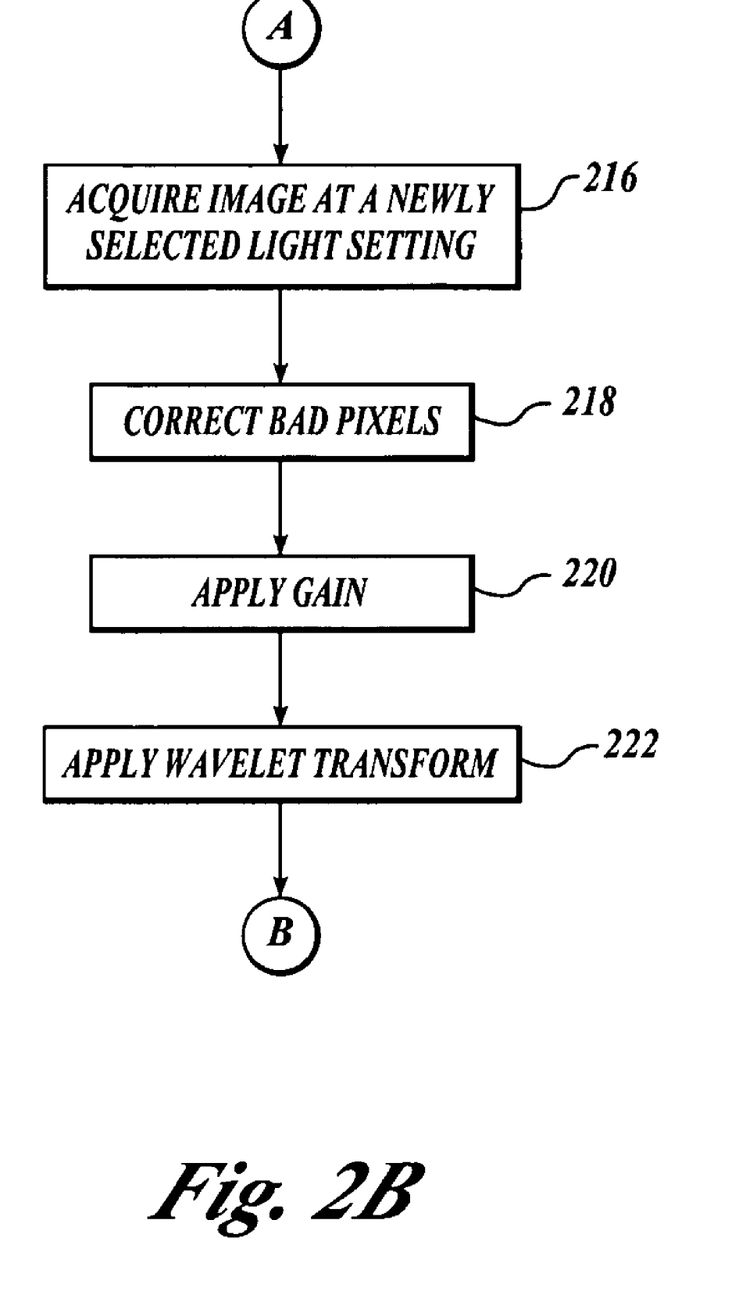
Figure 2C:
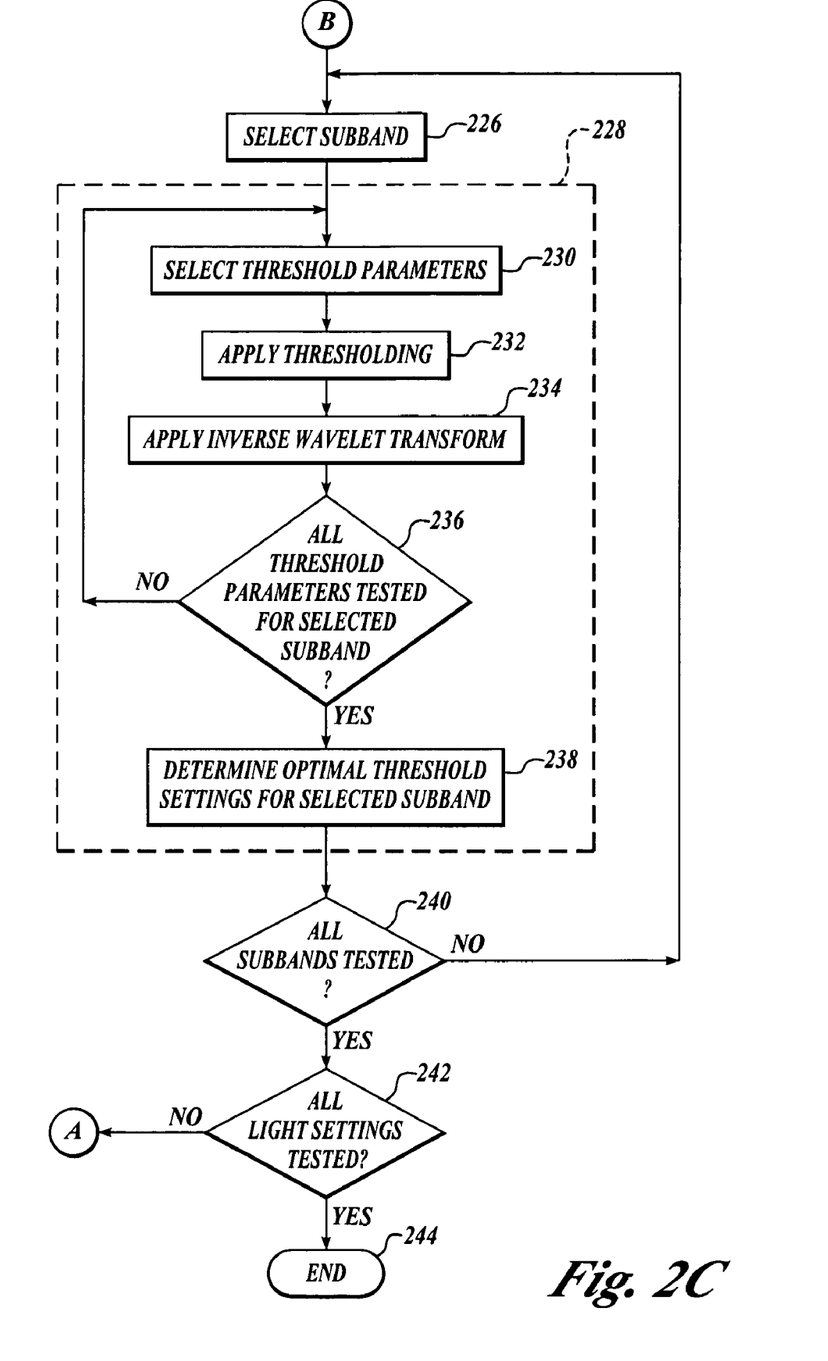

FIGS. 2A–2C illustrate a process (200) for determining threshold settings in accordance with aspects of the present invention. Processing begins at start block 202, and proceeds to block 204. Processing proceeds from block 204 to block 216. According to one example, block 204 comprises blocks 206, 208, 210, and 212. At block 206, a reference image is acquired using good lighting conditions. According to one example, the shutter (114) is opened. Light is reflected off of the scene and received by image sensor 102. Column amplifier block 108 amplifies the output signals from selected pixels to provide a raw analog signal (A1). Front end processing block 110 processes signal A1 to provide a processed analog signal (A2). A/D block 116 is arranged to convert signal A2 into a digital signal (Dig) in response to signal A2. The digital image (Dig) is stored in memory 120.

Processing then proceeds from block 206 to block 208. At block 208, a dark image is acquired (e.g., from system 100). Processing then proceeds from block 208 to block 210. At block 210, the locations of the bad pixels identified from the dark image are stored in memory. According to one example, bad pixel correction may be performed by processing block 118 under the control of a program 122. According to one example, each good pixel location has a corresponding value of approximately zero when exposed by a dark (e.g., black) image. A pixel value greater than approximately zero corresponds to a bad pixel value. In one example, a bad pixel value may result from speckle noise that is caused by leakage current in the pixel. Higher non-zero pixel values indicate worse pixels. A predetermined number (N) of bad pixels are stored in a memory to map the bad pixel locations. According to one example, N corresponds to 1024. According to another example, the bad pixel locations are ordered from worst to best. Processing continues from block 210 to block 212.

At block 212, the reference image that is stored in memory is corrected for bad pixels. For example, the values associated with bad pixel locations (as determined at block 210) may be replaced by the average of the values associated with the good neighboring pixels. Processing then proceeds from block 212 to block 216.

At block 216, a test image is acquired at a newly selected light setting. The test image should be matched to the reference image such that the only difference between the reference image and the test image is the light setting. Processing flows from block 216 to block 218. At block 218, the test image is corrected for bad pixels such that the values associated with the bad pixel locations (as determined at block 210) are replaced. As described previously, the values associated with bad pixel locations may be replaced by the average value of the good neighboring pixels. Processing then proceeds from block 218 to block 220.

At block 220, the corrected test image is adjusted by amplifying the value associated with the pixels according to a gain setting. The gain setting is related to the selected light setting. According to one example, the gain setting is selected such that the mean pixel value of the adjusted test image matches the mean pixel value of the reference image. In another example, the maximum pixel values may be matched rather than the mean pixel values. According to one example, adjusting the corrected test image is accomplished by processing block 118 under the control of a program 122. Processing proceeds from block 220 to block 222.

At block 222, a wavelet transformation is applied to the adjusted image such that the adjusted image is decomposed into a plurality of sub-bands. According to one example, a three-level Haar wavelet transform is performed on the adjusted image. According to one example, the wavelet transformation is performed by processing block 118 under the control of programs 122. Processing proceeds from block 222 to block 226.

At block 226, one of the sub-bands is selected. Processing continues from block 226 to block 228. At block 228, approximately optimal threshold settings for the selected sub-band are determined. Processing flows from block 228 to decision block 240.

At decision block 240, the system determines whether all of the sub-bands have been tested for the selected test image. Processing proceeds from decision block 240 to block 226 when additional sub-bands should be tested. Alternatively, processing flows from decision block 240 to decision block 242 when all of the sub-bands have been tested. At decision block 242, the system determined whether all of the light settings have been tested. Processing continues from decision block 242 to block 216 when additional lights settings need to be tested. Alternatively, processing flows from block 242 to end block 244 when all of the light settings have been tested.

According to one example, block 228 comprises blocks 230, 232, 234, 238, and decision block 236. At block 230, threshold parameters are selected for the selected sub-band. According to one example, the threshold parameters are selected according to a threshold percentage (P %). A threshold value is selected such that P % of the wavelet coefficients have a magnitude that is less than the threshold value. The coefficients may be stored in histogram bins for thresholding when threshold percentages are utilized. At block 232, thresholding is applied to the selected sub-band using the selected threshold parameters. Processing continues from block 232 to block 234 where an inverse wavelet transformation is performed on each of the sub-bands to provide a denoised test image. According to one example, the denoised test image is output to a display for viewing by an operator. Processing continues from block 234 to decision block 236.

At decision block 236, the system determines whether all of the threshold parameters have been tested for the selected sub-band. Processing flows from decision block 236 to block 230 when additional threshold parameters should be tested. Alternatively, processing proceeds from decision block 236 to block 238 when all of the threshold parameters have been tested. At block 238, approximately optimal threshold settings are determined for the selected sub-band. For example, an operator may view each of the denoised test images that were tested for the current sub-band. The operator may select one of the denoised test images as the subjectively best image. The threshold settings used for the subjectively best image may be selected as the approximately optimal threshold settings for the selected sub-band.

Each of the threshold parameter sets is tested in block 228. According to one example, for each sub-band, a threshold percentage of 5% is first selected at block 230. The threshold percentage is incremented by 5% each time block 230 is reached until a new sub-band is selected. At block 238, the system evaluates the results and determines which threshold percentage provided an approximately optimal denoising of the selected sub-band.

The results of process 200 may be used to construct a gain-threshold map in memory 120. The gain-threshold map may be organized as a lookup table. The lookup table links each of a plurality of gain settings to the associated set of threshold parameters for each sub-band for the gain setting (as determined by process 200). According to one example, the threshold parameters correspond to threshold percentages.

According to one example, process 200 may process the entire image such that the entire image is stored in memory. According to another example, process 200 may process a part of the image such that memory requirements are reduced. For example, process 200 may be applied to two lines of data at a time. The quality of the denoised image is degraded when the number of lines of data is reduced.

Process 200 may be applied to color images in addition to grey-scale images. Each color channel is processed separately according to process 200. White balancing is performed on the reference image such that each color channel may have a different gain setting.

Process 200 may be used to test threshold percentages for each sub-band at each of a plurality of gain settings. Process 200 may also be used to optimize other parameters such as wavelet filter type and length, the number of decomposition levels, and the thesholding type. For example, other types of wavelet types may be tested, such as Daubechies wavelet transformations and Symmlet wavelet transformations. Haar wavelet transformations may be preferable under typical operating conditions. Daubechies wavlet transformations may be preferable in applications where a blocky output image is undesirable and the original noise level is high.

Example of Wavelet Thresholding

Figure 3:
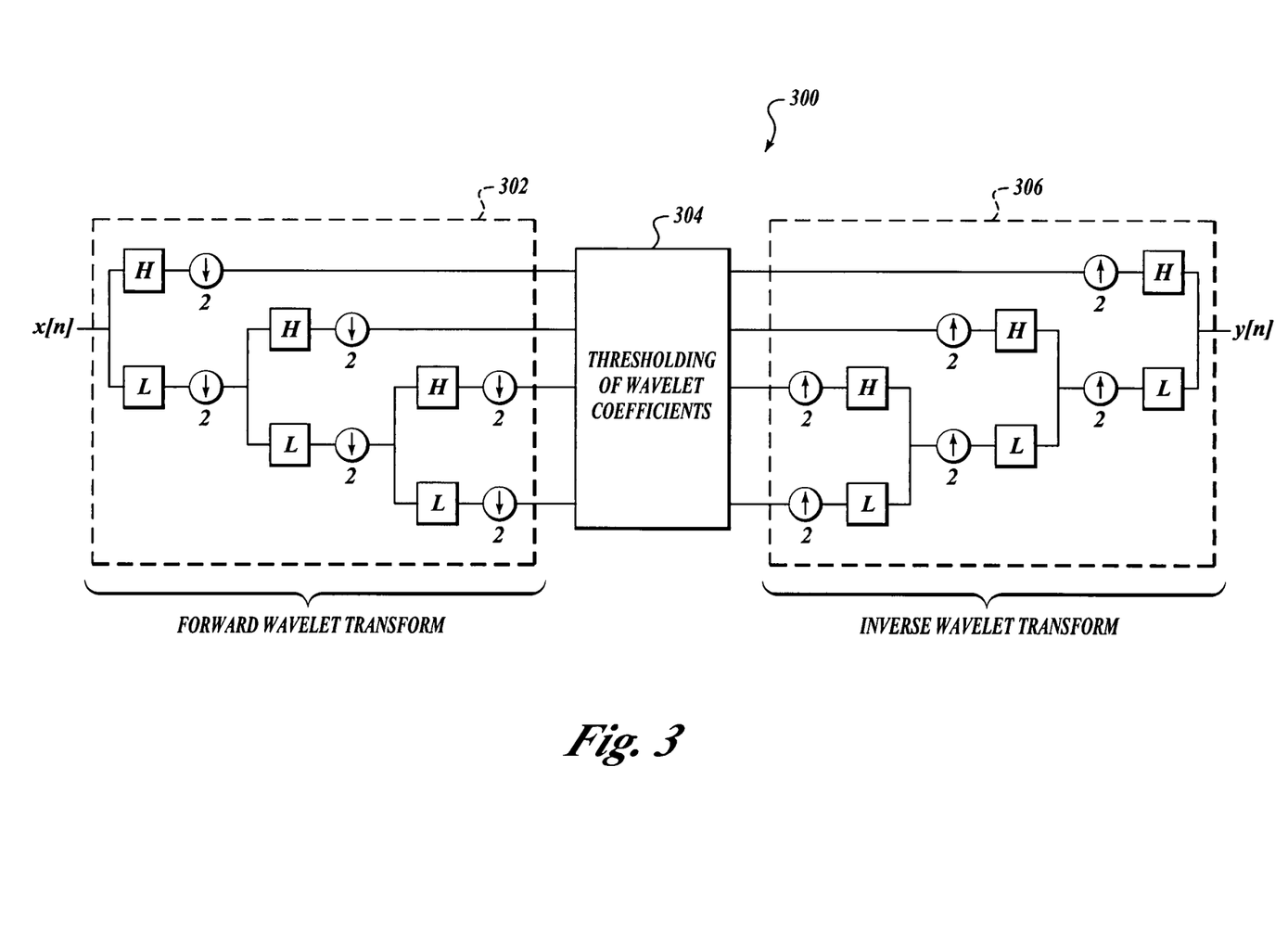
FIG. 3 illustrates example system functions for wavelet thresholding.

FIG. 3 illustrates example system functions (300) for wavelet thresholding that is arranged in accordance with aspects of the present invention. System 300 comprises a forward wavelet transformation block (302), a thresholding block (304), and an inverse wavelet transformation block (306). According to one example, system 300 is included in block 118 and is controlled by programs 122.

Forward wavelet transformation block 302 is configured to perform a wavelet transformation on an input signal (x[n]). According to one example, wavelet transformation block 302 is configured to perform a three level Haar wavelet transformation on x[n] to provide ten sub-bands as follows. At each level, an input signal is filtered by low pass and high pass decomposition filters to provide filtered outputs. The filtered outputs are sub-sampled by two (i.e. every other sample is discarded). Each sub-band can be determined by the equation:

$$z[n] = \sum_n x[n] \cdot h[2k - n],$$

where z[n] is the sub-band obtained after filtering by a decomposition filter with a frequency response of h[n] and then subsampling the filter output by two. Low and high frequency bands are provided in the horizontal direction and low and high frequency bands are provided in the vertical direction such that four resulting frequency sub-bands (low—low, low-high, high-low, and high—high) are provided. The low—low sub-band is the input signal to each subsequent level, because most of the image data is concentrated in the low—low sub-band. According to one example, forward wavelet transformation block 302 may be used in block 222.

Threshold block 304 is arranged to threshold the decomposition output coefficients. Coefficients having a magnitude that is less than the threshold level are set to a value of zero. The coefficients having a magnitude that is greater than the threshold value are not changed when hard thresholding is implemented. The threshold value is added to coefficients that are less than zero and have a magnitude that is less than the threshold value when soft thresholding is implemented. The threshold value is subtracted from coefficients that are greater than the threshold when soft thresholding is implemented. According to one example, threshold block 304 may be used in block 232.

Inverse wavelet transformation block 306 is configured to perform an inverse wavelet transformation on the sub-bands to provide an output image signal (y[n]). Each threshold output is filtered with reconstruction wavelet filters. According to one example, each filtered output is then upsampled by two, first through rows and then through columns. According to one example, inverse wavelet transformation block 306 may be used in block 234.

Example of Image Denoising Using Gain-Threshold Map

Figure 4:
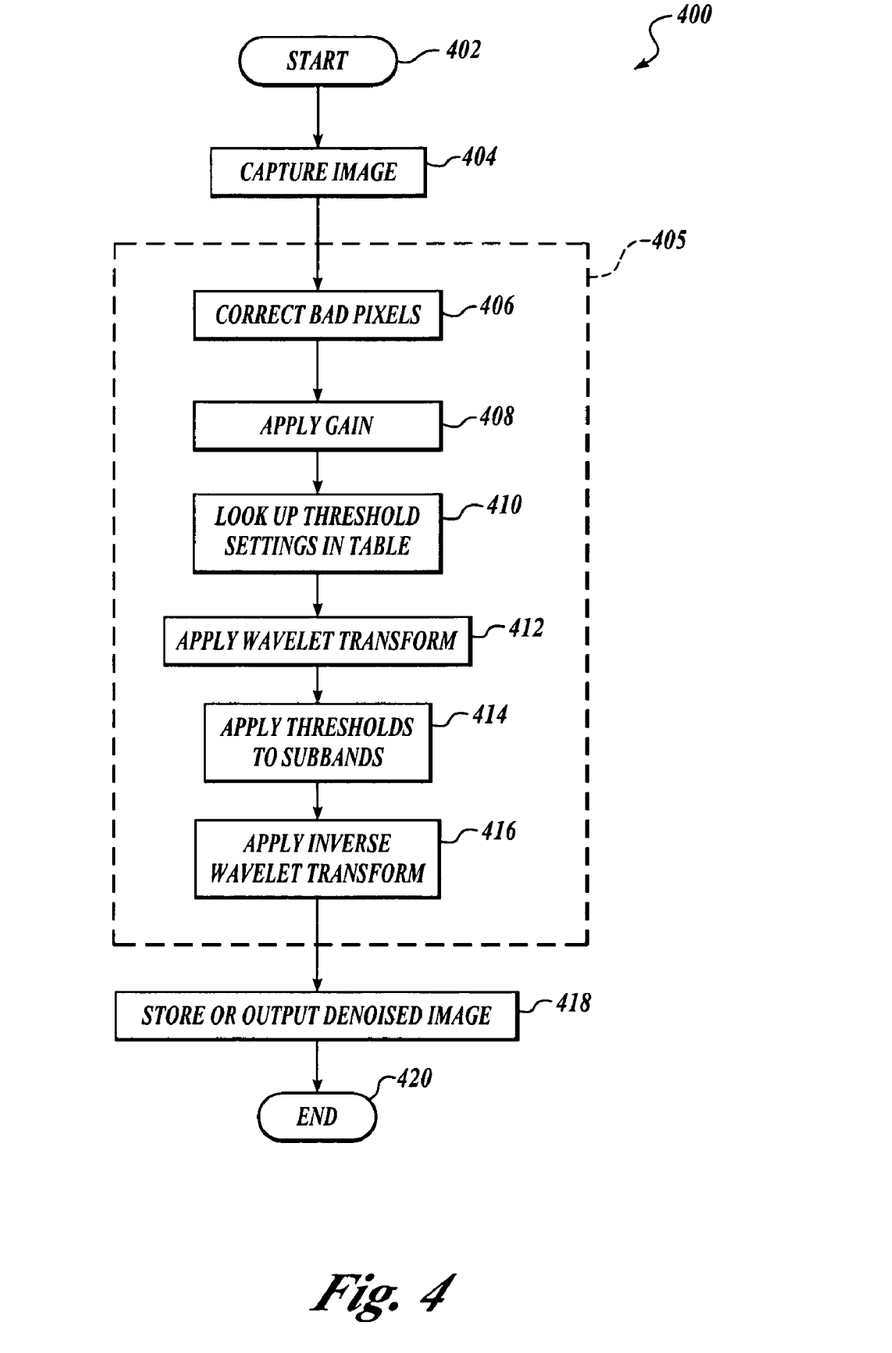
FIG. 4 illustrates a process for providing a denoised image, in accordance with aspects of the present invention.

FIG. 4 illustrates a process (400) for providing a denoised image, in accordance with aspects of the present invention. Processing begins at a start block (402). Processing then proceeds from start block 402 to block 404. At block 404, an image is captured and stored in memory. According to one example, the shutter (114) is opened. Light is reflected off of the scene and received by image sensor 102. Column amplifier block 108 amplifies the output signals from selected pixels to provide a raw analog signal (A1). Front end processing block 110 processes signal A1 to provide a processed analog signal (A2). A/D block 116 is arranged to convert signal A2 into a digital signal (Dig) in response to signal A2. The digital image (Dig) is stored in memory 120.

Processing then proceeds from block 404 to block 405, where the captured image is processed. For example, the capture image may be processed in processing block 118 under the control of a program (122). Processing proceeds from block 405 to block 418. At block 418, the denoised image is stored or output. Processing continues from block 418 to block 420 where processing is terminated.

According to one example, block 405 comprises block 406, block 408, block 410, block 412, block 414, and block 416. At block 406, the captured image is corrected for bad pixels. According to one example, correction of the bad pixels is performed by processing block 118 under the control of a program 122. Processing then proceeds from block 406 to block 408. At block 408, the corrected image is adjusted by amplifying the pixel values according to a gain setting. The gain setting may be selected manually by a user, or automatically according to the lighting conditions. Processing proceeds from block 408 to block 410. At block 410, threshold settings are retrieved from a gain-threshold map according to the selected gain setting. The gain-threshold map may be provided as a lookup table that links each of a plurality of gain settings to associated threshold parameters for each sub-band for the selected gain setting. According to one preferred embodiment, the optimal set of threshold parameters comprises an optimal threshold percentage for each sub-band for the selected gain setting. The threshold percentage corresponds to a threshold value. The threshold percentage represents the percentage of wavelet coefficients that have a magnitude that is less than the threshold value.

Processing flows from block 410 to block 412. At block 412, a wavelet transformation is applied to the adjusted image to provide sub-bands. According to one example, the wavelet transformation is performed by wavelet transformation block 302. Processing then proceeds from block 412 to block 414, where thresholding is applied to the sub-bands. According to one example, thresholding is performed by threshold block 304. The thresholding is applied according to the threshold parameters that were retrieved from the gain-threshold map for the selected gain setting. According to one example, soft thresholding is applied. Processing then proceeds form block 414 to block 416. At block 416, an inverse wavelet transformation is applied to each of the sub-bands to provide the denoised image. According to one example, the inverse wavelet transformation is accomplished by block 306. Processing then proceeds from block 416 to block 418.

The gain-threshold map may be constructed from results obtained from applying process 200. Different threshold values for each sub-band are preferable when the gain setting is high and also when the noise level is high. The threshold settings may be preferably set to the median value of wavelet composition when noise levels are low.

Process 400 may be performed on color images and grey-scale images. Each color channel is processed separately according to process 400. Each color channel is adjusted differently for white balancing. The settings for each color channel are retrieved separately on the gain-threshold map since the gain amount is different for each channel.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for image processing, the apparatus comprising:
    an image sensor circuit, wherein the image sensor circuit is configured to selectively provide a captured image; and
    an image processing and control block that is arranged to provide a denoised image, wherein the image processing and control block includes a memory, and wherein the image processing and control block is configured to:
        adjust a stored image according to a selected gain setting to provide an adjusted image, wherein the stored image is related to the captured image,
        perform a wavelet transformation on the adjusted image such that the adjusted image is decomposed into a plurality of sub-bands,
        select a set of threshold parameters from a gain-threshold map in response to the selected gain setting, wherein the gain-threshold map is stored in the memory and organized as a lookup table that maps a plurality of gain settings to a corresponding set of predetermined approximately optimal threshold parameters for each sub-band;
        threshold each of the plurality of sub-bands according to the selected set of threshold parameters to provide thresholded sub-bands; and
        perform an inverse wavelet transformation on the thresholded sub-bands to provide the denoised image.

2. The apparatus of claim 1,
wherein the image sensor circuit comprises:
    an image sensor that includes a plurality of pixel sensors that are organized into rows and columns, wherein the image sensor is configured to selectively provide the captured image as a plurality of pixel output signals;
    a row control logic block that is configured to select at least one row of the image sensor in response to a row control signal;
    a column control logic block that is configured to select at least one column of the image sensor in response to a column control signal;
    a column amplifier block that is configured to provide a raw analog signal in response to pixel output signals;
    a front end processing block that is configured to perform gain and offset correction on the raw analog signal to provide a processed analog signal; and
wherein the image processing and control block is further arranged to:
    provide row and column control signals,
    convert the processed analog signal into a digitized image,
    store the digitized image to provide the stored image, and
    apply correction to the stored image at a plurality of predetermined pixel locations that are associated with bad pixels in the image sensor.

3. The apparatus of claim 1, wherein the image processing and control block is further configured to adjust the stored image by selecting gain settings for each color plane in a color image and adjusting the stored image with the selected gain settings such that the adjusted image is white balanced; and wherein the image processing and control block is further configured to select the set of threshold parameters, where separate threshold parameters are provided for each color plane associated with the adjusted image.

4. The apparatus of claim 1, wherein the wavelet transformation is one of a Haar wavelet transformation, a Daubechies wavelet transformation, and a Symmlet wavelet transformation.

5. The apparatus of claim 1, wherein the image processing and control block is configured for at least one of: manual selection of the gain setting by user interaction, and automatic selection of the gain setting for the apparatus in response to a luminance that is associated with stored image.

6. The apparatus of claim 1, wherein each set of predetermined approximately optimal threshold parameters comprises a plurality of threshold percentages, each of the plurality of threshold percentages is associated with an associated sub-band, thresholding each of the plurality comprises thresholding each sub-band of the plurality of sub-bands according to the threshold percentage for the associated sub-band, and wherein the threshold percentage corresponds to a percentage of wavelet coefficients of the associated sub-band that will be set to approximately zero when the plurality of sub-bands are thresholded.

7. The apparatus of claim 1, further comprising a means for constructing that is configured to construct the gain-threshold map.

8. The apparatus as in claim 7, wherein the means for constructing comprises:
   a first means for acquiring that is configured to acquire a reference image;
   a first means for storing that is configured store to the reference image;
   a second means for acquiring that is configured acquire to a test image;
   a second means for storing that is configured to store the test image;
   a means for adjusting that is configured to adjust the test image according to a gain setting to provide another adjusted image, wherein the gain setting is related to a luminance that is associated with test image;
   a means for applying that is configured to apply a wavelet transformation to the other adjusted image to provide a test plurality of sub-bands;
   a means for providing that is configured to select one sub-band of the test plurality of sub-bands, and further configured to provide a plurality of test output images by, for the selected sub-band:
      applying the selected threshold parameter to provide a filtered sub-band, and
      applying an inverse wavelet transformation using the filtered sub-band and also using the non-selected sub-bands to provide one of the plurality of test output images; and
   a means for linking that is configured to link the gain setting to an approximately optimal set of threshold parameters for each sub-band, wherein the optimal set of threshold parameters is determined based upon on analysis of each of the plurality of test output images.

9. A method for image processing, the method comprising:
   adjusting a stored image according to a selected gain setting to provide an adjusted image;
   performing a wavelet transformation on the adjusted image such that the adjusted image is decomposed into a plurality of sub-bands;
   selecting a set of threshold parameters from a gain-threshold map in response to the selected gain setting, wherein the gain-threshold map is stored in the memory and organized as a lookup table that maps a plurality of gain settings to a corresponding set of predetermined approximately optimal threshold parameters for each sub-band;
   thresholding each of the plurality of sub-bands according to the selected set of threshold parameters to provide thresholded sub-bands; and
   performing an inverse wavelet transformation on the thresholded sub-bands to provide the denoised image.

10. A method for determining wavelet sub-band threshold parameters, the method comprising:
   acquiring a reference image;
   storing the reference image;
   acquiring a test image;
   storing the test image;
   adjusting the test image according to a gain setting to provide an adjusted image, wherein the gain setting is related to a luminance that is associated with the test image;
   applying a wavelet transformation to the adjusted image to provide a plurality of sub-bands;
   selecting one of the plurality of sub-bands as the selected sub-band; and
   for the selected sub-band:
      selecting one threshold parameter of the set of threshold parameters as the selected threshold parameter,
      applying the selected threshold parameter to provide a filtered sub-band, and
      applying an inverse wavelet transformation using the filtered sub-band and also using the non-selected sub-bands to provide one of the plurality of test output images.

11. The method of claim 10, further comprising selecting each of the plurality of sub-bands in turn as the selected sub-band.

12. The method of claim 10, the method further comprising white-balancing the reference image such that each color channel has a different gain setting.

13. The method of claim 10, further comprising correcting the reference image and the test image, wherein:
   receiving the reference image is accomplished under good lighting conditions; and
   wherein correcting the reference image and the test image comprises:
      receiving a dark image,
      evaluating the dark image to determine which pixel locations corresponds to bad pixel locations,
      storing the bad pixel locations, and
      correcting a pixel value at each bad pixel location in the reference image.

14. The method of claim 10, further comprising constructing a gain-threshold map, wherein constructing the gain-threshold map comprises linking the gain setting to an approximately optimal set of threshold parameters for each sub-band, wherein the optimal set of threshold parameters is determined based upon on analysis of each of the plurality of test output images.

15. The method of claim 14, further comprising:
   scaling a stored image according to a selected gain setting to provide an scaled image;
   performing a wavelet transformation on the scaled image, such that the scaled image is decomposed into another plurality of sub-bands;
   selecting a set of threshold parameters from the gain-threshold map in response to the selected gain setting;
   thresholding each sub-band of the other plurality of sub-bands according to the selected set of threshold parameters to provide thresholded sub-bands; and
   performing an inverse wavelet transformation on the thresholded sub-bands to provide a denoised image.

16. The method of claim 10, wherein the gain setting is selected such that a one of a mean pixel value and a maximum pixel value of the adjusted image corresponds to the one of the mean pixel value and the maximum pixel value of the reference image.

17. The method of claim 10, wherein the test image comprises one of an entire image and a subset of the entire image.

18. The method of claim 10, wherein the wavelet transformation comprises a three-level Haar wavelet transformation such that the number of the plurality of sub-bands is ten.

19. The method of claim 10 further comprising testing each of the following parameters: wavelet filter type, wavelet filter length, the number of wavelet decomposition levels, and the thresholding type.

20. The method of claim 10, wherein the set of threshold parameters comprises a set of threshold percentages, and wherein each threshold percentage of the set of threshold percentages corresponds to a percentage of wavelet coefficients of the selected sub-band that will be set to approximately zero when the threshold percentage is applied to the selected sub-band.

* * * * *